United States Patent [19]
Höcker

[11] Patent Number: 5,913,678
[45] Date of Patent: Jun. 22, 1999

[54] ARRANGEMENT FOR SEALING COMBUSTION-CHAMBER BRICKS

[75] Inventor: Rainer Höcker, Waldshut-Tiengen, Germany

[73] Assignee: ABB Research Ltd., Zurich, Switzerland

[21] Appl. No.: 08/949,614

[22] Filed: Oct. 14, 1997

[30] Foreign Application Priority Data

Oct. 11, 1996 [DE] Germany ............... 196 41 957

[51] Int. Cl.⁶ .................................................. F27D 1/00
[52] U.S. Cl. ........................... 432/247; 432/251; 432/252
[58] Field of Search ................. 432/253, 254.1, 432/254.2, 115, 242, 30, 40, 95, 27, 28, 251, 252, 247, 248

[56] References Cited

U.S. PATENT DOCUMENTS

| | | | |
|---|---|---|---|
| 3,082,995 | 3/1963 | Krapf | ........................................ 432/40 |
| 5,176,495 | 1/1993 | Honkomp et al. | . |

FOREIGN PATENT DOCUMENTS

| | | |
|---|---|---|
| 863 153 | 1/1953 | Germany . |
| 20 55 803 | 5/1972 | Germany . |
| 41 14 768 A1 | 11/1991 | Germany . |
| 43 14 160 A1 | 11/1993 | Germany . |
| 195 24 875 A1 | 1/1996 | Germany . |
| WO 88/03629 | 5/1988 | WIPO . |

*Primary Examiner*—Teresa Walberg
*Assistant Examiner*—Jiping Lu
*Attorney, Agent, or Firm*—Burns, Doane, Swecker & Mathis, L.L.P.

[57] ABSTRACT

In an arrangement for sealing combustion-chamber bricks (8) which are force-cooled in a convective manner, the bricks (8) being arranged in at least two brick rows (6) in accordance with of an increasing combustion-space diameter and being put into supporting casings (7), and the cooling medium (12) flowing between brick (8) and supporting casing (7), and a gap (9) being present between the supporting casing (7) of the preceding brick row (6) and the respectively following brick row (6), which gap (9) is sealed by means of a seal (10), a plurality of springs (11) are firmly anchored to the supporting casing (7) in a distributed manner over the periphery, which springs (11) are connected to the seal (10) and press the seal (10) into the gap (9) between supporting casing (7) and brick (8) at least during the operation of the combustion chamber. The sealing effect is thereby increased without thermal stresses being introduced. The arrangement according to the invention is readily suitable for the conversion of existing combustion chambers, since it requires no alteration to the hitherto used bricks (8), the supporting casings (7) or seals (10).

8 Claims, 3 Drawing Sheets

ARRANGEMENT FOR SEALING COMBUSTION-CHAMBER BRICKS

BACKGROUND OF THE INVENTION

1. Field of the Invention

The invention relates to the field of combustion technology. It relates to an arrangement for sealing combustion-chamber bricks with increased sealing effect, which can be used for silo combustion chambers and boilers.

2. Discussion of Background

Combustion chambers, for example of gas-turbine plants, are subjected to high thermal stresses. For this reason, in order to avoid thermal stresses, the innermost walls of the combustion chambers are composed of many individual bricks connected relatively loosely to the supporting casing. This loose connection inevitably leads to gaps between the bricks and the supporting casing. Since the bricks are air-cooled, the gaps cause undesirable leaks. It is known, in particular in the head region of the bricks, to seal larger gaps with seals. These seals are likewise loosely inserted for thermal reasons and are fastened in a spot-like manner by means of seal locking features.

On account of the changing boundary conditions in combustion technology, however, such a solution no longer meets today's requirements. The high combustion temperatures desired, for example in gas-turbine plants, make it necessary for a larger quantity of cooling air to be used for cooling the combustion chamber. On the other hand, there is the demand for a reduction in the NOx emissions during the combustion. It is therefore necessary to further reduce the remaining leaks of the combustion chamber in order to minimize the leakage loss.

SUMMARY OF THE INVENTION

Accordingly, one object of the invention, in attempting to avoid all these disadvantages, is to provide a novel arrangement for sealing combustion-chamber bricks which enables the sealing effect to be increased compared with the known prior art without causing thermal stresses. In addition, the arrangement is to be capable of being used without altering the known bricks, the supporting casing and the seal and is therefore to be readily suitable for the conversion of existing combustion chambers.

This is achieved according to the invention in that, in an arrangement according to the preamble of claim 1, a plurality of springs are firmly anchored to the supporting casing in a distributed manner over the periphery, which springs are connected to the seal and press the seal into the gap between supporting casing and brick at least during the operation of the combustion chamber.

The advantages of the invention consist in the fact that the seals pressed under spring tension against the supporting casing and/or brick minimize the gaps between seal and brick or supporting casing. The sealing effect is thereby increased, and the combustion chamber can be operated with modern combustion techniques. The springs additionally attached compared with the seals according to the hitherto known prior art, which are only fastened in a spot-like manner, can be anchored, for example welded, to the supporting casings without problem. Conversion of existing combustion chambers is therefore readily possible, since no alterations to the hitherto used bricks, the supporting casing or the seal are necessary.

It is especially expedient if the spring presses the seal simultaneously against the supporting casing and the brick, since the sealing effect is then the best. However, it is also advantageous if contact pressure is produced only on the brick or on the supporting casing. In this case, too, the abovementioned gap will be reduced.

Furthermore, it is advantageous if commercially available helical springs, leaf springs or torsion bar springs are used as the spring.

Finally, the material and geometry of the spring are advantageously selected in such a way that it is virtually free of force in the cold state of the combustion chamber and the spring forces correctly adjust themselves in the hot state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings of a gas-turbine silo combustion chamber, wherein.

DESCRIPTION OF THE PREFERRED EMBODIMENTS

Figure 1:
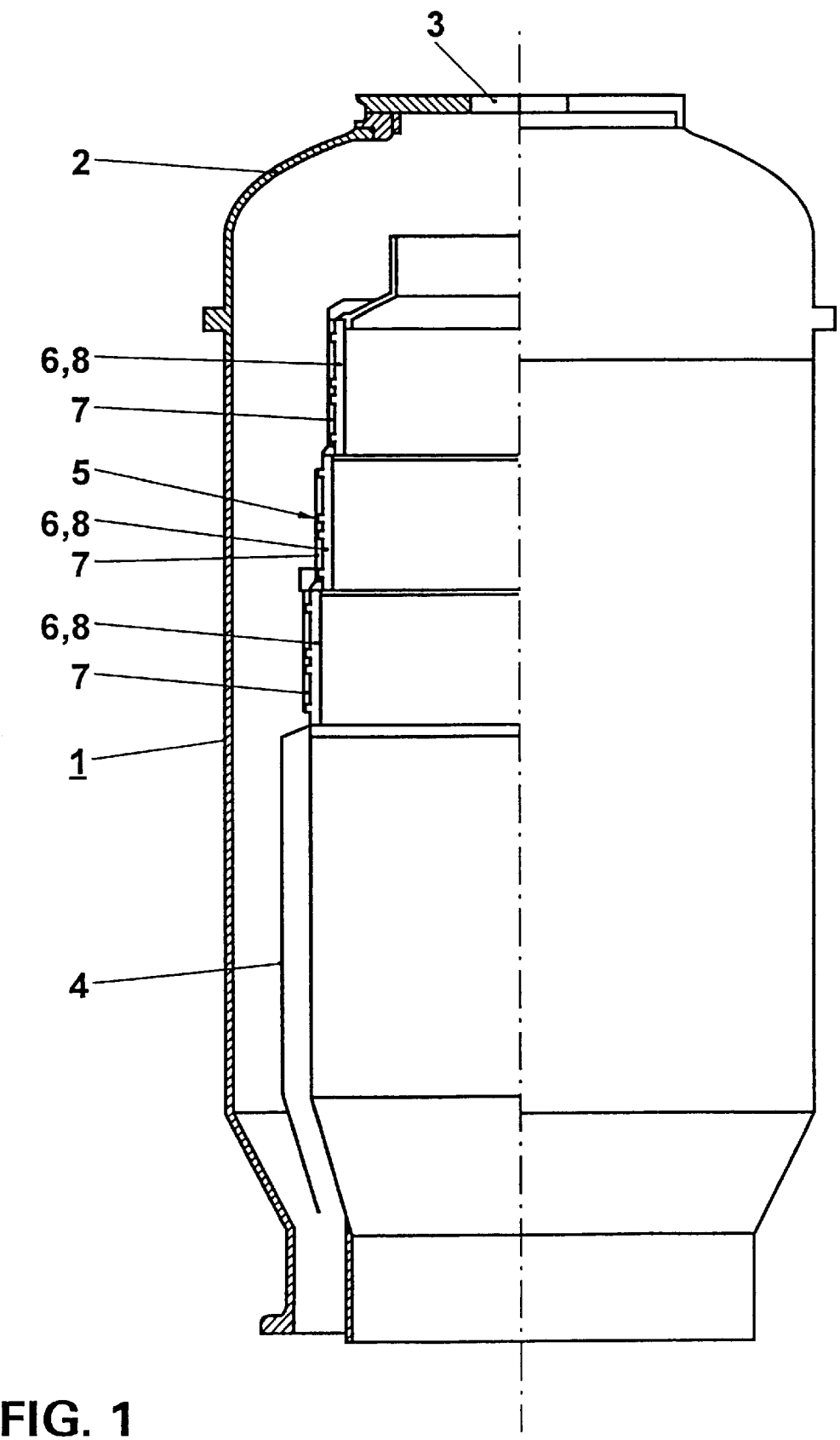
FIG. 1 shows a schematic representation of the combustion chamber in a longitudinal section.

Referring now to the drawings, wherein like reference numerals designate identical or corresponding parts throughout the several views, only the elements essential for understanding the invention are shown, elements of the plant which are not shown are, for example, the burners and the secondary-air nozzles, and the direction of flow of the working media is designated by arrows, FIG. 1 shows a schematic representation of a silo combustion chamber for a gas turbine. Almost the entire air delivery volume of the compressor is brought to operating temperature in this silo combustion chamber by combustion of liquid or gaseous fuel.

The combustion chamber consists of a pressure-tight outer casing 1 on which an arched combustion-chamber cover 2 is flange-mounted as top combustion-chamber closure. The combustion-chamber cover 2 is provided with an opening 3 for the burner (not shown here). The bottom part of the combustion chamber is formed by a bottom combustion-chamber insert 4 (not described in any more detail here).

The hottest zone of the combustion chamber is enclosed by a brick insert 5 in order to avoid thermal stresses, which brick insert 5 is suspended on the outer casing 1 via a supporting bolt (not shown).

According to FIG. 1, the brick insert 5 consists of three brick rows 6. The latter are stepped toward the bottom in accordance with of an increasing combustion-space diameter. Each of the brick rows 6 is composed of many individual bricks 8 connected relatively loosely to a cylindrical supporting casing 7. The bricks 8 are put in place in the supporting casing 7 and can easily be exchanged. The loose connection between brick 8 and supporting casing 7 inevitably leads to gaps 9 between the bricks 8 of the first brick row 6 and the supporting casing 7 of the second brick row 6 and respectively between the bricks 8 of the second brick row 6 and the supporting casing 7 of the third supporting row 6. Since the bricks 8 are air-cooled, the gaps 9 cause undesirable leaks, as a result of which the cooling air 12 can penetrate into the combustion chamber. Therefore, seals 10 are arranged there in each case for the purpose of sealing the gaps 9. According to the invention, the seals 10 are pressed under spring tension of a spring 11, 11' against the bricks 8 and/or the supporting casing 7 in such a way that the gaps 9 are minimized.

Figure 2:
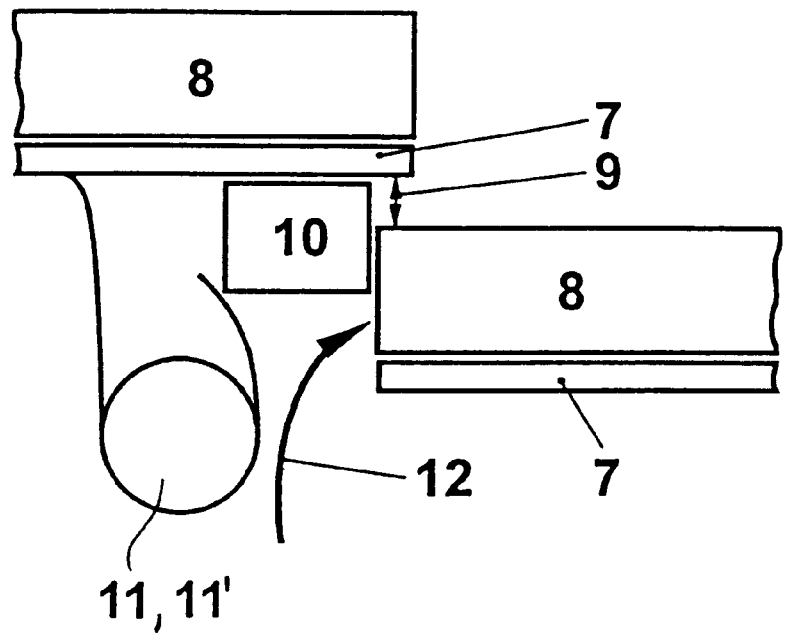
FIG. 2 shows a detail of FIG. 1 in the region of the brick inserts in a first embodiment variant of the invention.

This is illustrated in more detail in FIG. 2. In a detail of FIG. 1 (longitudinal section), FIG. 2 schematically shows the region of the combustion chamber in which two successive brick rows adjoin one another. The bricks 8 of each row are in each case put into a supporting casing 7. The bricks 8 are force-cooled in a convective manner; specifically, the cooling air 12 flows between brick 8 and supporting casing 7. The gap 9 to be sealed is located between the supporting casing 7 of the first brick row and the bricks 8 of the second brick row. The seal 10 (sealing ring) is inserted there. At the supporting casing 7 for the first brick row, a plurality of helical springs 11 are firmly anchored to the supporting casing 7 in the vicinity of the seal 10 in a distributed manner over the periphery. They may be welded on for example. The springs 11 press the seal 10 into the approximately right-angled gap between supporting casing 7 and brick 8. In this case, the spring force may be oriented in such a way that a contact pressure is produced either only on the brick 8 or only on the supporting casing 7 or else on both. The latter is to be preferred, since the sealing effect is then the best.

Figure 2A:
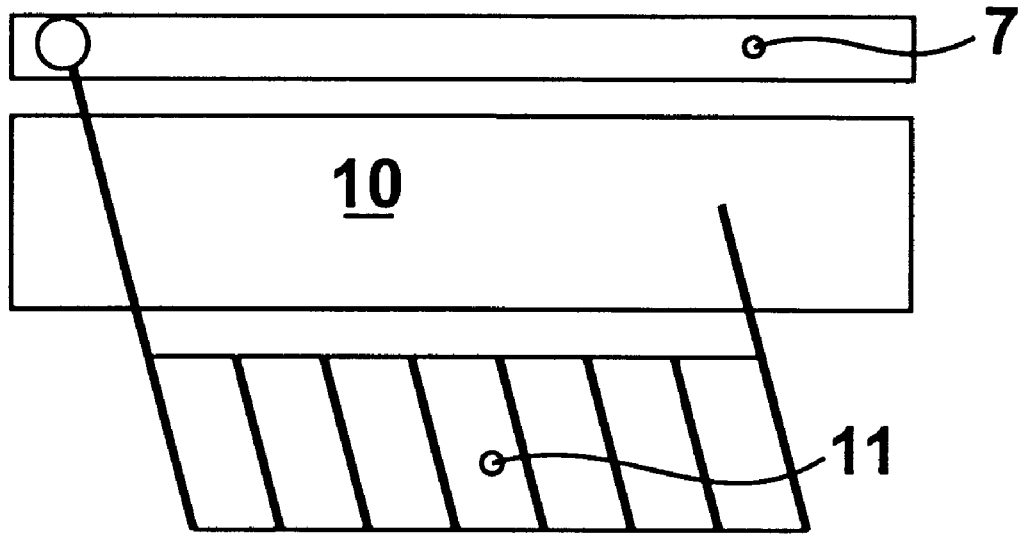
FIG. 2a shows a side view detail of a helical spring arranged in FIG. 2.
Figure 2B:
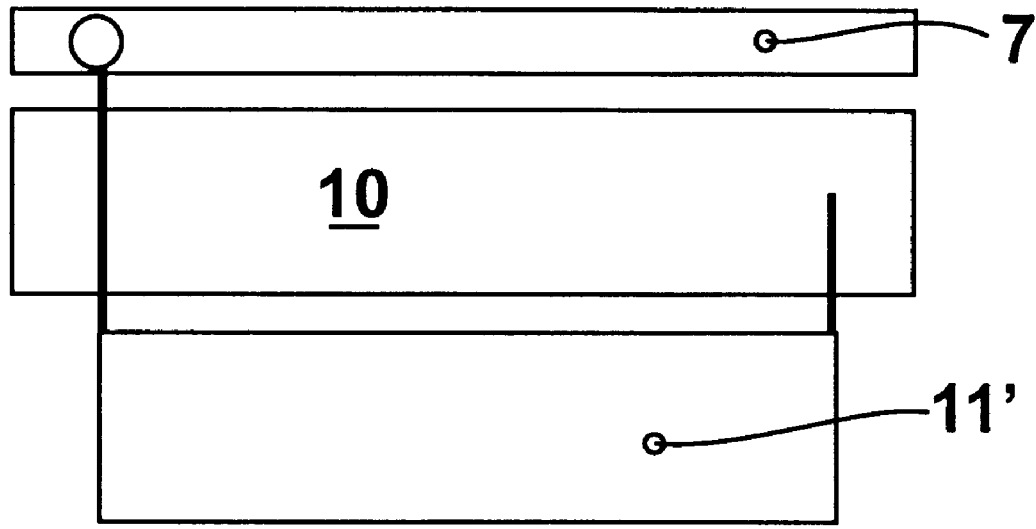
FIG. 2b shows a side view detail of a torsion bar spring as arranged in FIG. 2.

A helical spring 11, as shown in FIG. 2a, may be arranged in the combustion chamber or, alternatively, a torsion spring fastened to the supporting casing 7 with a certain pretension may also be arranged, as shown in FIG. 2b.

The practical construction of the sealing arrangement is especially advantageous if it is virtually free of force in the cold state of the combustion chamber and the spring forces adjust themselves correctly in the hot state of the combustion chamber by suitable selection of the geometry and the materials of the spring 11.

Figure 3:
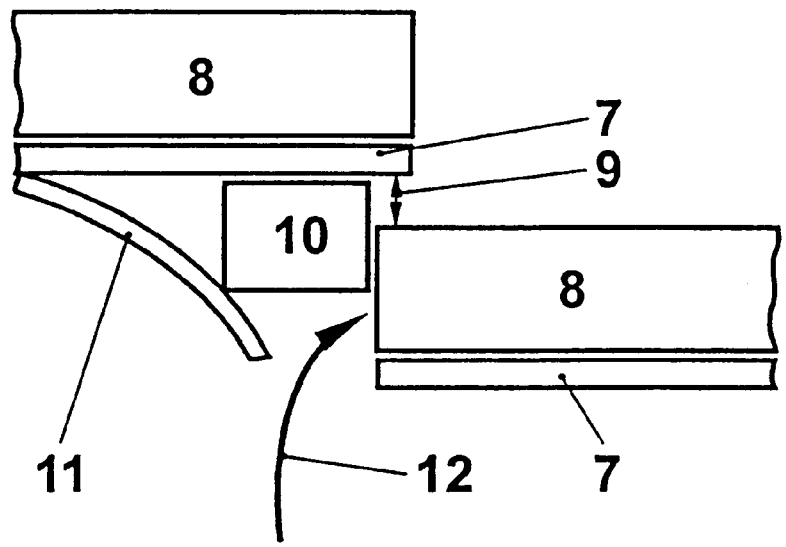
FIG. 3 shows a further embodiment variant of the invention.

FIG. 3 shows a further embodiment variant of the invention. In this case, the spring 11 is a leaf spring which is firmly attached under pretension to the supporting casing 7.

The invention is of course not restricted to the exemplary embodiments described here. It may also be used for boilers for example.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An arrangement for sealing combustion-chamber bricks which are force-cooled in a convection manner, said arrangement comprising:

a plurality of bricks arranged in at least two brick rows in accordance with an increasing combustion-space diameter, said bricks of each brick row being loosely connected to a respective supporting casing, a cooling medium flowing between said bricks and said supporting casing, and a gap being defined between the supporting casing of one of said brick rows and another of said at least two brick rows, said gap being sealed by means of a seal, wherein a plurality of springs are firmly anchored to the supporting casing of each brick row about a periphery of the supporting casing, said springs being connected to the seal such that said springs press the seal into the gap between said supporting casing and said bricks at least during the operation of the combustion chamber.

2. The arrangement as claimed in claim 1, wherein the spring presses the seal simultaneously against the supporting casing and the brick.

3. The arrangement as claimed in claim 1, wherein the spring presses the seal against the supporting casing.

4. The arrangement as claimed in claim 1, wherein the spring presses the seal against the brick.

5. The arrangement as claimed in claim 1, wherein the spring is a helical spring.

6. The arrangement as claimed in claim 1, wherein the spring is a torsion bar spring.

7. The arrangement as claimed in claim 1, wherein the spring is a leaf spring.

8. The arrangement as claimed in claim 1, wherein the material and geometry of the spring are selected in such a way that it is virtually free of force in the cold state of the combustion chamber and the spring forces correctly adjust themselves in the hot state such that said springs press the seal into the gap between said supporting casing and said bricks at least during the operation of the combustion chamber.

* * * * *